Aug. 6, 1963    J. B. McCABE ET AL    3,099,906
CASE FILLING MECHANISM
Filed Feb. 17, 1961    22 Sheets-Sheet 2

INVENTOR.
John B. McCabe
BY Ulrich J. Schmid
Attorneys

Aug. 6, 1963

J. B. McCABE ET AL 3,099,906

CASE FILLING MECHANISM

Filed Feb. 17, 1961

INVENTOR.
John B. McCabe
BY Ulrich J. Schmid

Attorneys

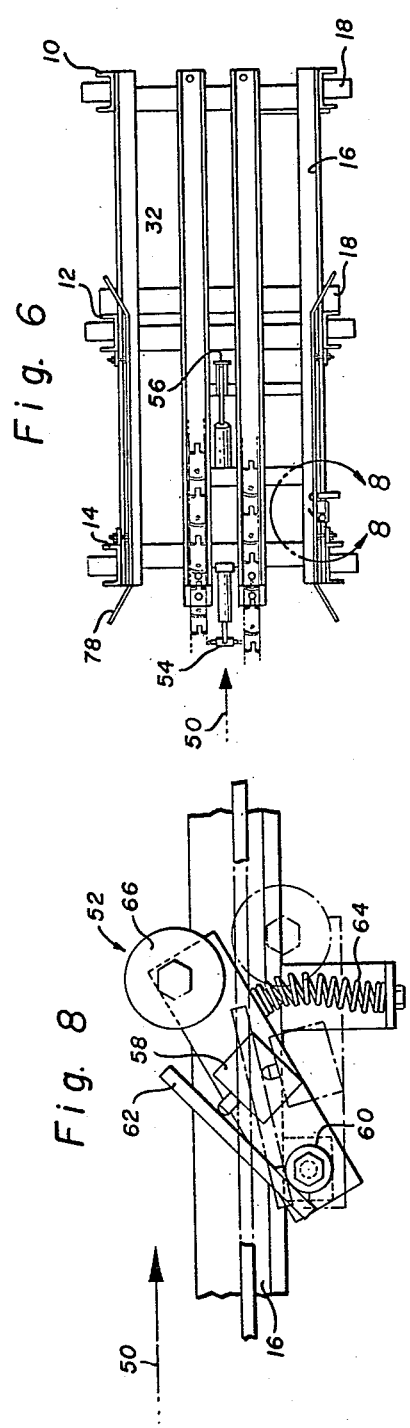
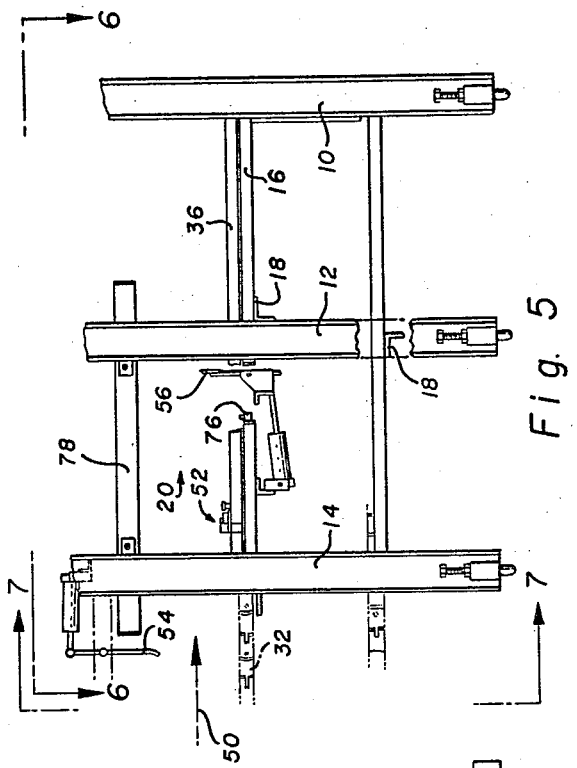
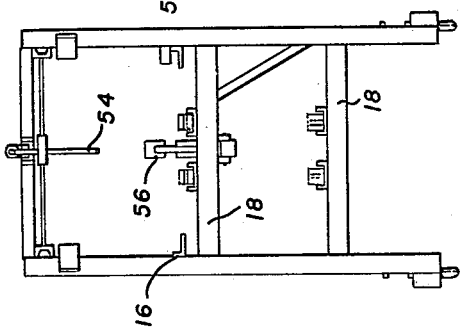

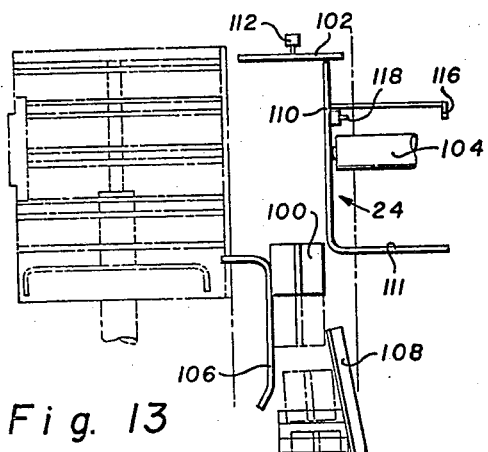
Fig. 13
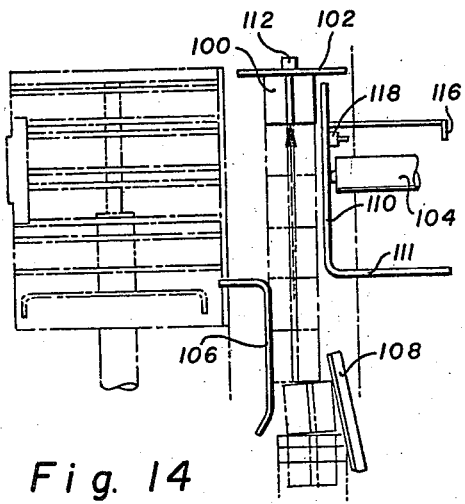
Fig. 14
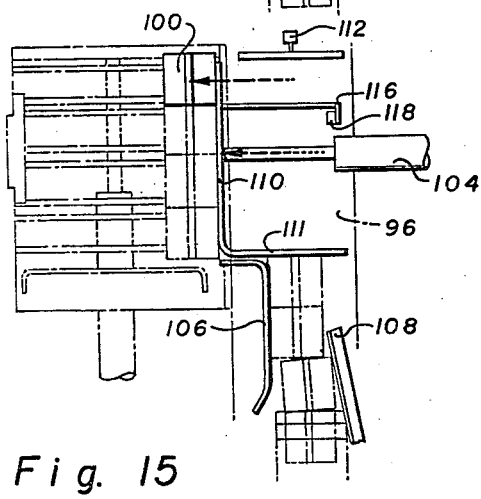
Fig. 15
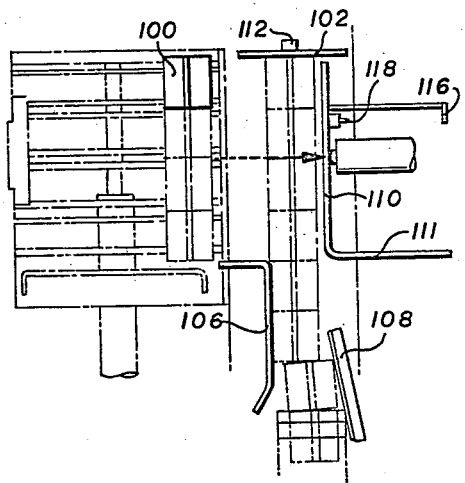
Fig. 16
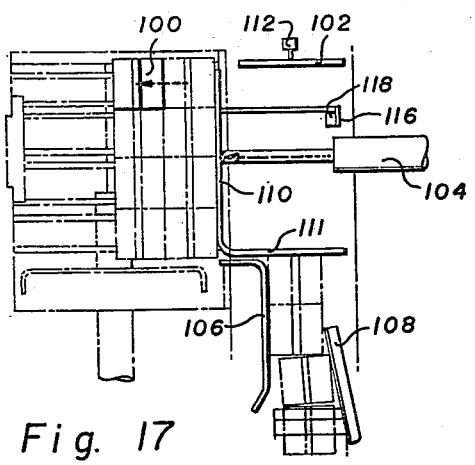
Fig. 17
*INVENTOR.*
John B. McCabe
BY  Ulrich J. Schmid
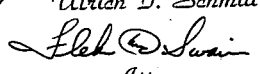
*Attorneys*

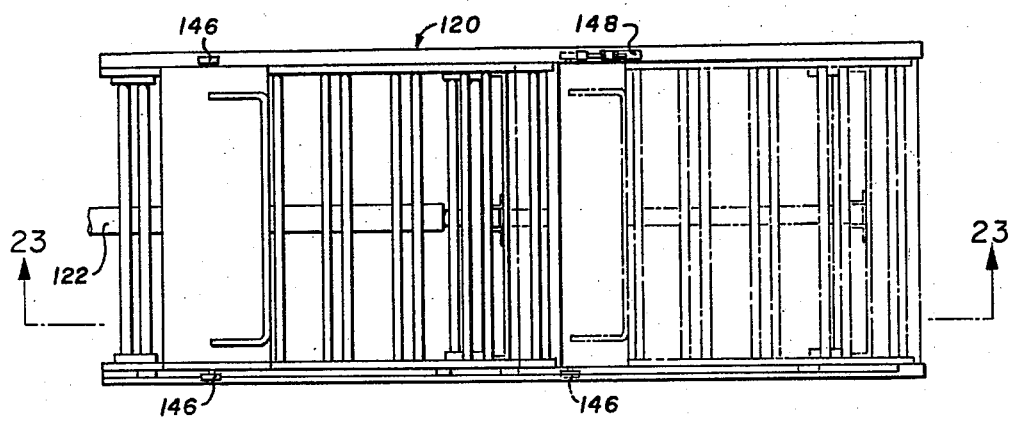
Fig. 22
Fig. 23
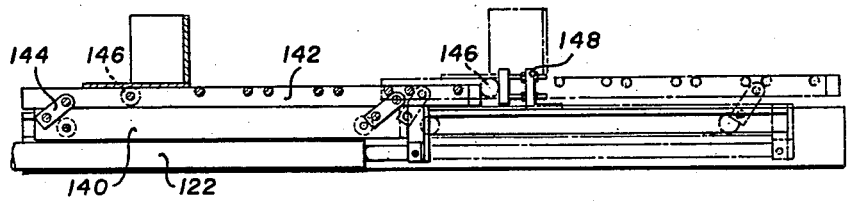
Fig. 24
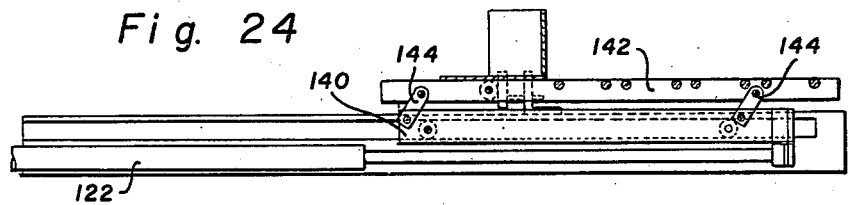
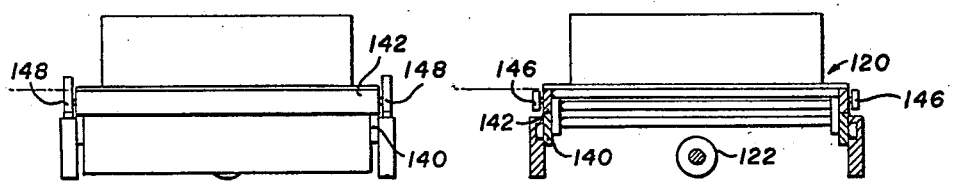
Fig. 25     Fig. 26

Aug. 6, 1963    J. B. McCABE ET AL    3,099,906
CASE FILLING MECHANISM
Filed Feb. 17, 1961    22 Sheets-Sheet 10

INVENTOR.
John B. McCabe
BY Ulrich J. Schmid
Attorneys

INVENTOR.
John B. McCabe
Ulrich J. Schmid
BY
Attorneys

INVENTOR.
John B. McCabe
BY Ulrich J. Schmid
Attorneys

INVENTOR.
John B. McCabe
BY Ulrich J. Schmid
Attorneys

Aug. 6, 1963   J. B. McCABE ET AL   3,099,906
CASE FILLING MECHANISM

Filed Feb. 17, 1961   22 Sheets-Sheet 17

INVENTOR.
John B. McCabe
Ulrich J. Schmid
BY
Attorneys

Aug. 6, 1963   J. B. McCABE ET AL   3,099,906
CASE FILLING MECHANISM
Filed Feb. 17, 1961   22 Sheets-Sheet 18

INVENTOR.
John B. McCabe
Ulrich J. Schmid
BY
Attorneys

Aug. 6, 1963    J. B. McCABE ET AL    3,099,906
CASE FILLING MECHANISM

Filed Feb. 17, 1961    22 Sheets-Sheet 20

INVENTOR.
John B. McCabe
BY Ulrich J. Schmid

Attorneys

INVENTOR.
John B. McCabe
BY Ulrich J. Schmid

Flehr Swain
Attorneys

United States Patent Office 3,099,906
Patented Aug. 6, 1963

3,099,906
CASE FILLING MECHANISM
John B. McCabe, Fort Atkinson, Wis., and Ulrich J. Schmid, Dallas, Tex.; said McCabe assignor to The Creamery Package Mfg. Company, Chicago, Ill., a corporation of Illinois, and said Schmid assignor to Foremost Dairies, Inc., San Francisco, Calif., a corporation of New York
Filed Feb. 17, 1961, Ser. No. 90,099
5 Claims. (Cl. 53—59)

This invention relates to case filling machines, and is particularly concerned with machines of this character for use in the filling of cases with containers such as milk cartons or bottles.

It is an object of the present invention to provide a machine that will receive a substantially continuous supply of individual containers, and load these containers in substantially automatic fashion into empty cases for delivery to further operations such as stacking of the cases or assembly into pallet loads for transportation.

It is another object of the invention to provide a case filling machine that will receive the containers one by one, arrange them into a layer or pattern corresponding to the interior of a case, and then load or deposit the layer or pattern of containers within the case.

It is a further object of the invention to provide a case filling machine that will automatically receive a succession of empty cases and filled containers, fill each case with a full load of containers and deliver the filled cases to further plant operations.

Another object of the invention is to provide a case filling machine of the above character which operates in continuous fashion, in a series of successive operating steps, to load empty cases with one or more layers of filled containers.

Still another object of the invention is to provide a case filling machine of the above character that is simple in construction, light in weight, and which occupies a minimum of floor space.

Other objects and advantages of the invention will be apparent from the following description of preferred embodiments thereof, as illustrated in the accompanying drawing, in which:

FIGURE 5 is a fragmentary view in side elevation, taken from the left of FIGURE 4, and showing the case holding station;

FIGURE 6 is a view in horizontal section taken along the line 6—6 of FIGURE 5;

FIGURE 7 is a view in vertical section taken along the line 7—7 of FIGURE 5;

FIGURE 8 is a detail view of a case stop mechanism, indicated at 8—8 in FIGURE 5;

FIGURES 13 to 17 are schematic views in top plan of the apparatus shown in FIGURE 4, illustrating the operation of the container transfer station;

FIGURE 22 is an enlarged plan view, illustrating details of the pattern table at the assembly station;

FIGURE 23 is a view in section along the line 23—23 of FIGURE 22;

FIGURE 24 is a like view showing the table in extended position;

FIGURES 25 and 26 are views respectively, in section and end elevation thereof;

In general, the case filling machine of the present invention is adapted to operation with material handling and conveying equipment of the type employed in the bottling, dairy and similar industries. By way of illustration, the machine can be employed in a warehouse or factory to simultaneously receive empty cases and filled containers, such as cartons of milk, bottled goods, or the like, for automatic deposit of the containers within the cases and discharge of the filled cases to various other plant or warehouse operations. The machine performs the function of receiving the empty cases, simultaneously receiving the filled containers, successively forming the individual containers into patterns or layers of containers in an assembly area, transferring each pattern of containers to a loading or case filling zone, and then depositing the pattern within an empty case. Simultaneously with the deposit of a layer or pattern of containers within a case, a new layer of containers is formed for transfer to the loading zone. The machine can load or fill each case with a layer of containers, or alternatively, perform an indexing function whereby successive layers of containers can be deposited in each case.

In one embodiment of the machine (FIGURES 1 to 58), the containers are delivered to the machine above the empty cases, which pass through the machine at a convenient working level, and the patterns of cartons formed and successively lowered into the cases. In another embodiment of the machine (FIGURES 59 to 66), each empty case is elevated or raised within the machine to receive the containers, followed by discharge at the raised level or a lower level.

GENERAL DESCRIPTION

Figure 1:
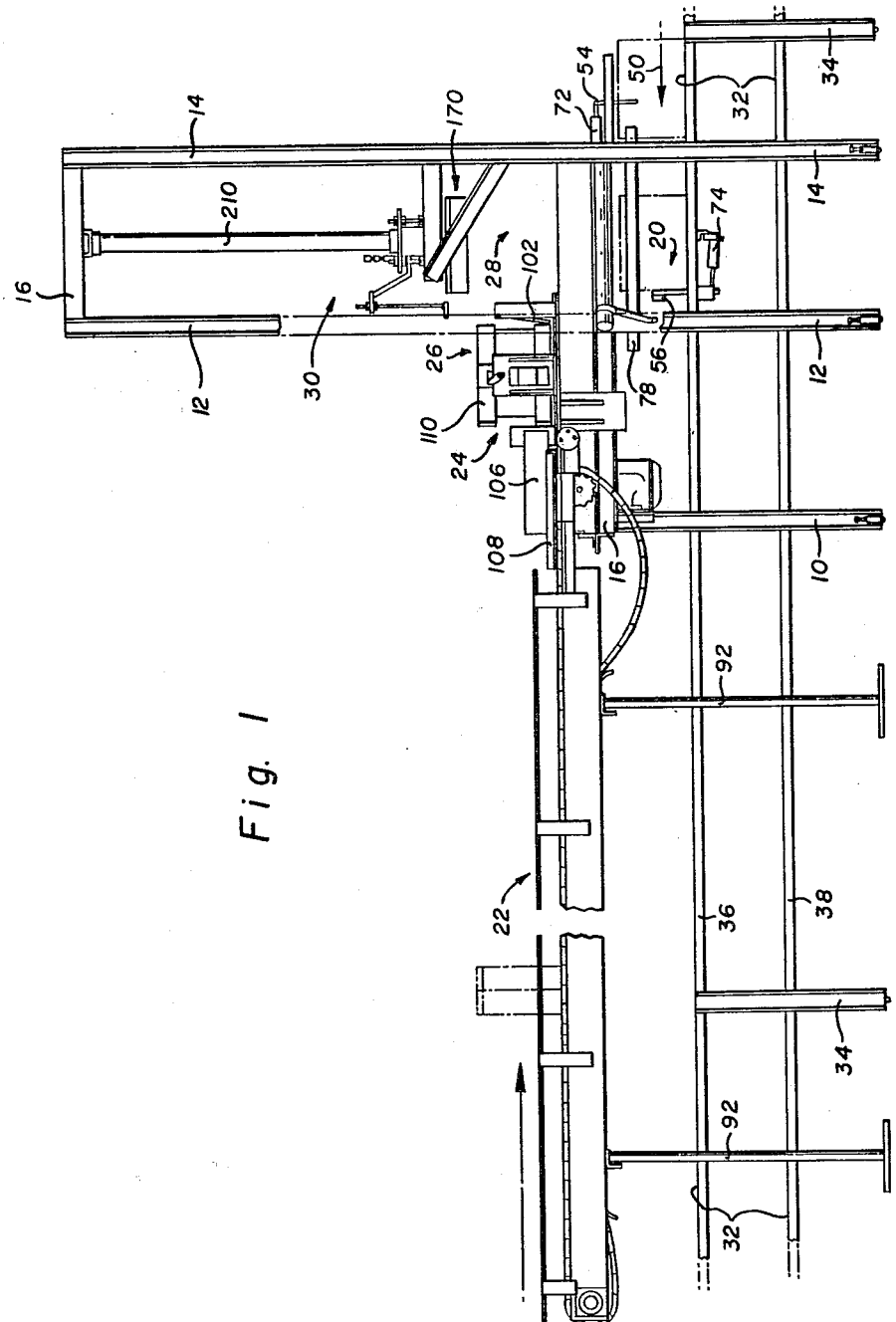
FIGURE 1 is a view in side elevation of a machine embodying the invention.
Figure 58:
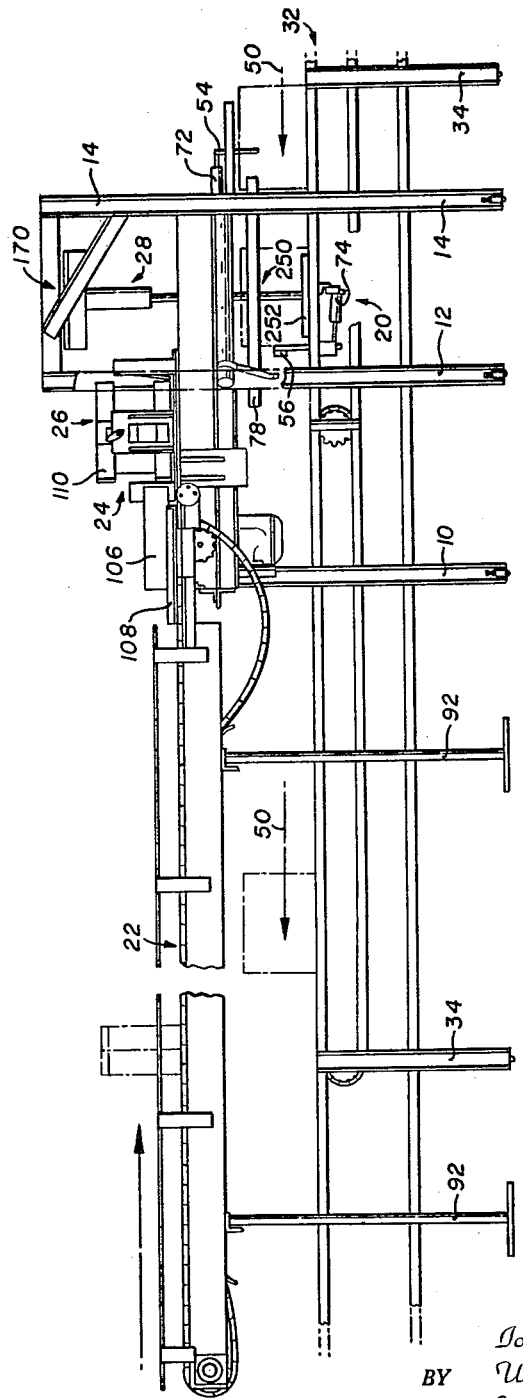
FIGURE 58 is a view in side elevation, similar to FIGURE 1, of another machine embodying the invention.

The embodiment of the machine illustrated in FIGURES 1 to 58 comprises a frame including vertical side frames 10, 12 and 14 suitably connected with cross bracing 16 and transverse supports 18. The frame provides a support for various operating stations within the machine including a case holding station 20 employing an appropriate case stop mechanism, a feed conveyor 22 for the individual containers, a container transfer station 24 including a transfer mechanism, an assembly station 26 including a pattern table and shift mechanism, a loading station 28 including a gripper mechanism adapted to support a loading or filling pattern of the containers, and a loading elevator 30 adapted to operate in synchronized relationship with the assembly and case holding stations in the case filling operation.

The particular case filling machine shown in the drawings is adapted to operate in conjunction with a supply of filled, waxed paper board cartons of the type commonly employed in the sale of milk and similar items by the dairy industry, and cases of wood, wire, plastic, or other suitable construction having dimensions to receive such cartons. The machine functions to receive empty cases delivered by the conveyor 32 (right to left in FIGURES 1 and 2) and to hold each case at the station 20 until the machine has operated to fill the case with cartons. In the latter operation, individual cartons are fed in single file by the conveyor 22 to the transfer station 24 where parallel groups of cartons (four, in the illustrated apparatus) are fed onto the pattern table of the assembly station 26. The latter functions upon receiving a predetermined pattern of cartons to deliver the same to the gripper mechanism at the loading or filling station 28. At station 28, the loading elevator 30 functions to lower the gripper mechanism and the pattern of cartons into the empty case at the holding station 20. The latter then frees the filled case for discharge with the case conveyor 32.

The illustrated machine is designed for operation in conjunction with a pneumatic system employing compressed air or other gaseous fluid. Fluid pressure is supplied by a power cylinder (not shown) to the main supply line 40 (FIGURE 53) and at a constant pressure. This line delivers the air through various purifying apparatus 42 to a high pressure line 44. It also supplies air through suitable pressure reducing apparatus 46 to a low pressure line 48. In general, the line 44 supplies pressure to various valves, air locks, bleeding poppets, operating cylinders, and other units of the control system of the machine. The line 48 supplies air of reduced pressure to the valve for the loading elevator to insure a safe, low pressure operation during the case filling step.

If desired, the machine can also be designed to operate in conjunction with a hydraulic system in which oil, water, or other liquid can be employed as the hydraulic fluid.

Conveyer and Case Holding Station

The case conveyer 32 (FIGURES 1 and 4) functions to deliver empty cases one after the other, in the direction of the arrow 50, to the holding station 20. In the straight through embodiment, such conveyer preferably operates substantially above floor level to facilitate filling of the cases with cartons delivered by the carton conveyer 22. Any suitable supporting framework can be provided for this purpose, such as the support columns 34 and side frame members 36 and 38 for the upper and lower reaches of the conveyer units.

Figure 2:
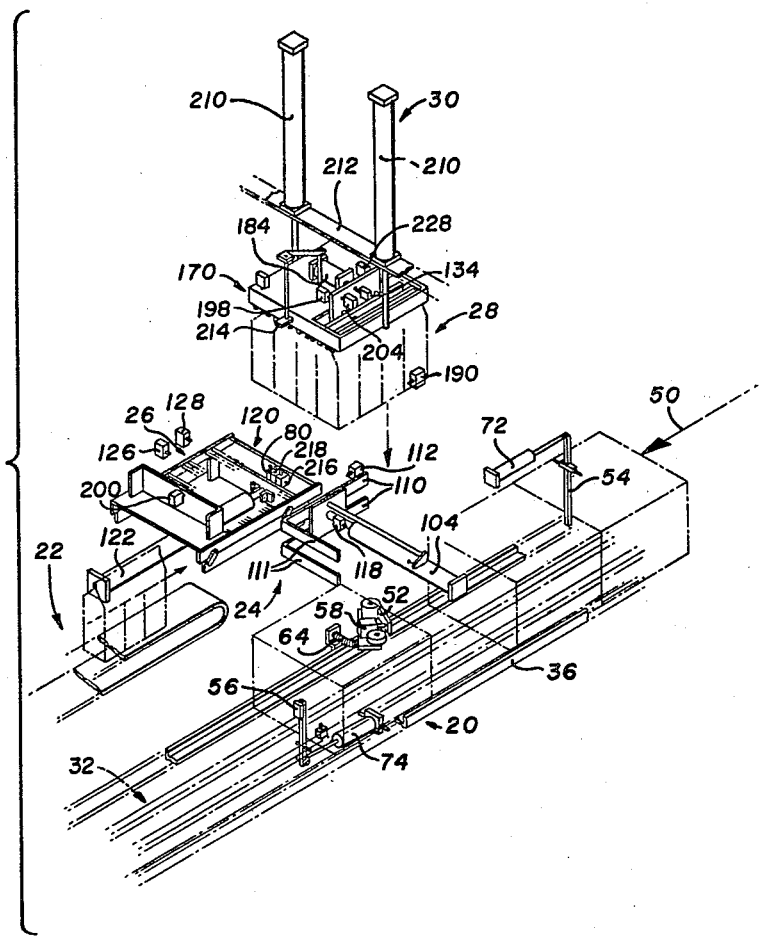
FIGURE 2 is a schematic view in perspective of the essential components of the machine of FIGURE 1, illustrating the operation thereof.

The case holding station 20 (FIGURES 2 and 5 to 8) cooperates with the case conveyer to retain or hold each empty case at the station 20 until the machine has operated to fill the case with cartons. As best illustrated in FIGURE 2, the conveyer 32 causes each case entering the holding station to contact the switching mechanism 52. The latter operates to lower a primary case stop 54 inside the second case in line and, simultaneously, to raise a secondary case stop 56 from beneath the case conveyer. The entering case is therefore allowed to move into the machine until it contacts the secondary stop 56, which functions to position the case within the machine for the filling operation.

Figures 53, 53A:
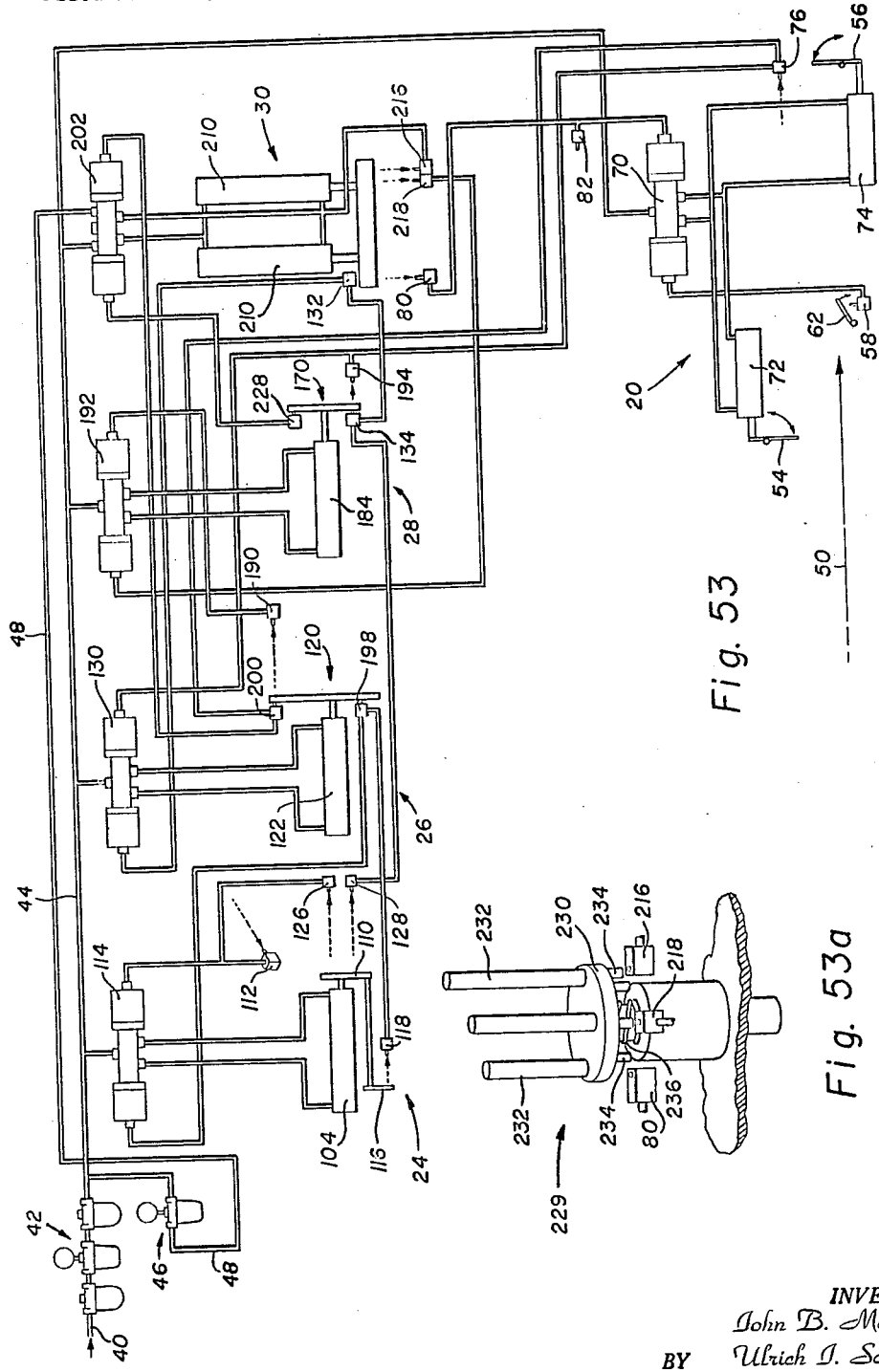
FIGURE 53 is a schematic view illustrating a control system employed with the machine of FIGURE 1.
FIGURE 53A is a fragmentary schematic view illustrating a modified system of control by which a repetitive case filling operation can be obtained.
Figure 54:
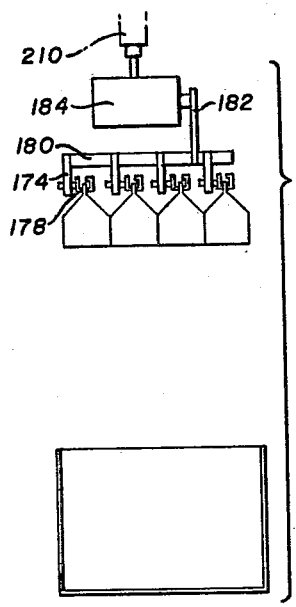
FIGURES 54 to 57 are schematic views illustrating the case filling operations in accordance with the modified system of control.

Referring to FIGURE 8, the switching mechanism 52 includes a poppet or switch 58 mounted on a pivot support 60, and adapted to be actuated by a plate 62 pivotally mounted on the pivot mount 60. The entire unit is normally biased inwardly of the case conveyer by a spring 64 provided on the outer end of the pivot mount 60. The pressure of this spring is insufficient to restrain free movement of a case past the switching mechanism 52. As best seen in FIGURE 53, the switch 58 shifts the selector valve 70 causing the air cylinder 72 to lower the primary case stop 54 and the air cylinder 74 to raise the secondary case stop 56. Subsequent movement of the case into contact with the stop 56 causes the case to contact an interlock 76 in the control circuit for the pattern table at station 26 and the loading elevator 30.

Referring to FIGURE 6, the entering case is positively positioned within the holding station 20 by the stop 56 and guide plates 78 provided on either side of the feed conveyer 32. The case is thus held in positively aligned relationship with the loading station 28 and elevator 30 throughout the case filling operation. When the loading elevator has completed its operation of filling the case, the switch 80 will function to shift the selector valve 70 to release the filled case for discharge on the conveyer. An additional switch 82 can also be provided to allow the case stop cylinders to be retracted manually should it be desired to reject a case in the holding station for any reason.

Carton Conveyer and Transfer Station

Figure 3:
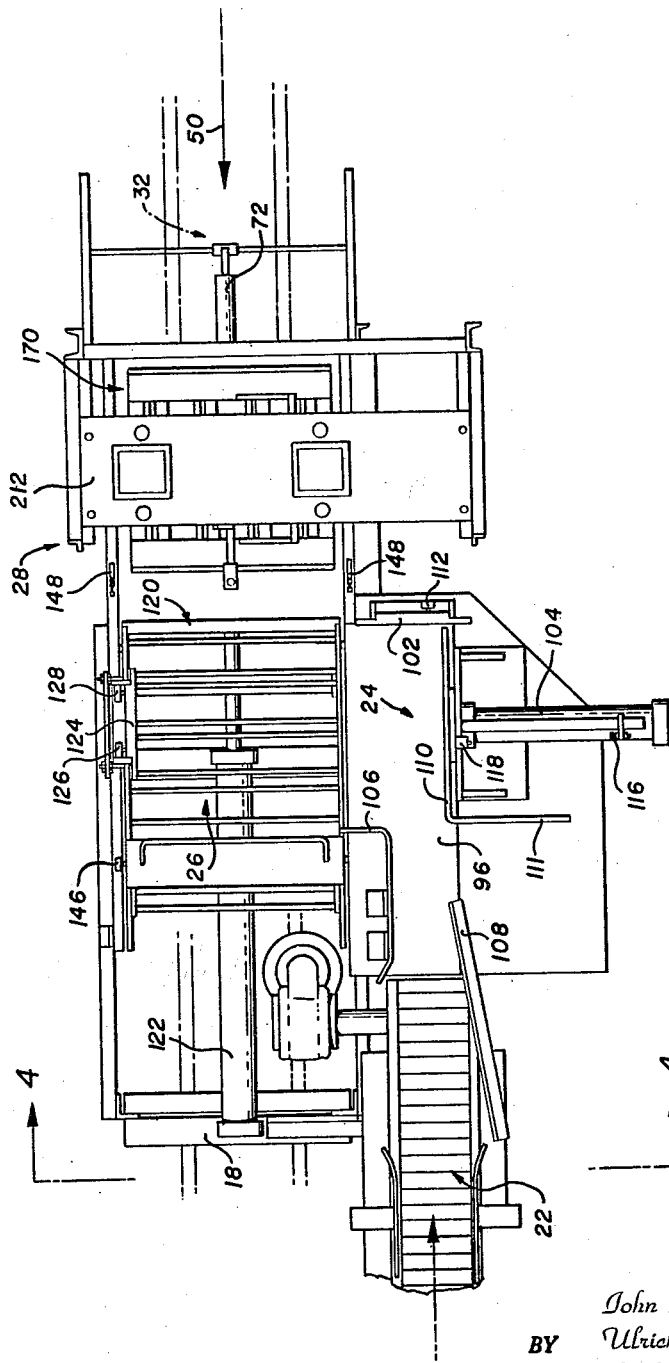
FIGURE 3 is a view in top plan, on an enlarged scale, of the machine of FIGURE 1.
Figure 4:
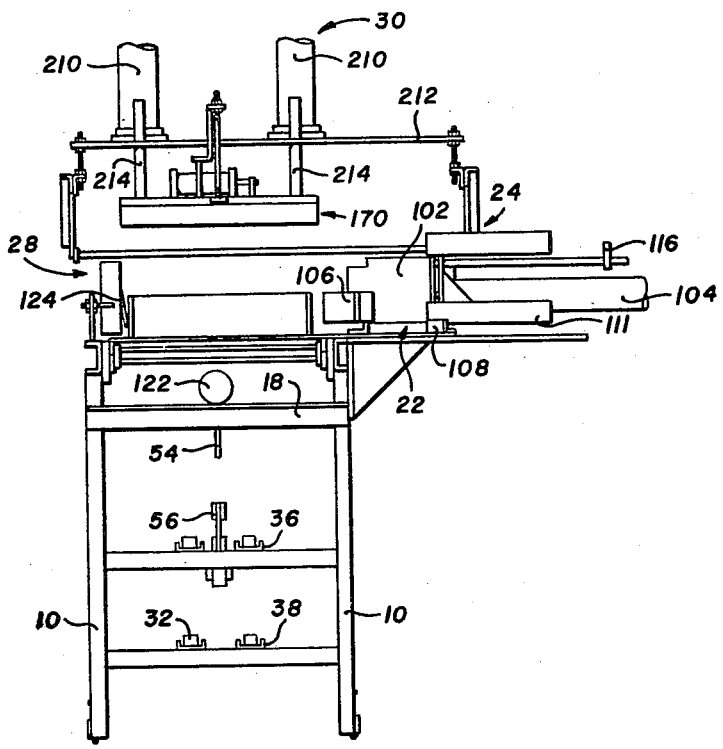
FIGURE 4 is a view in vertical section along the line 4—4 of FIGURE 3.
Figure 9:
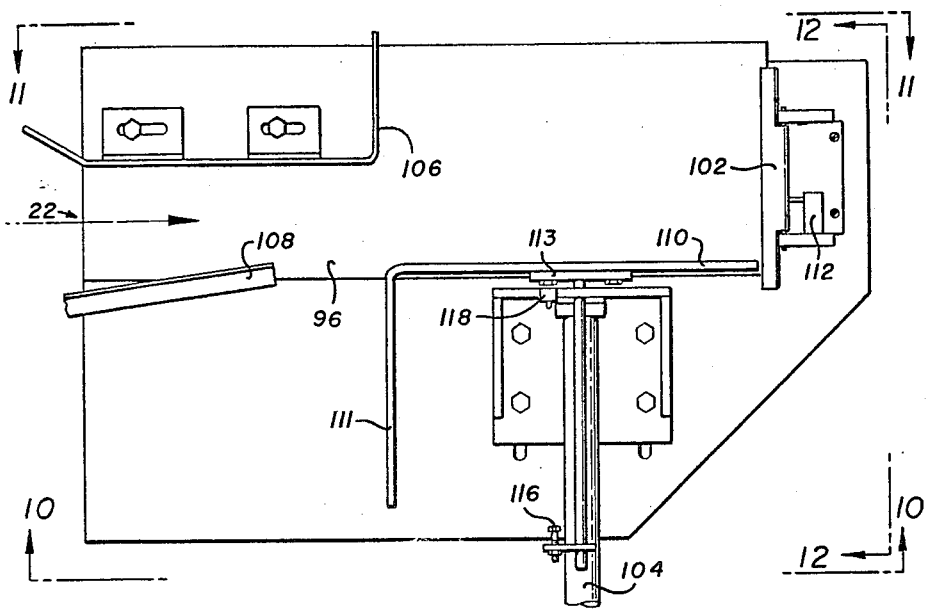
FIGURE 9 is a view of portions of the apparatus shown in FIGURE 3, on an enlarged scale, showing details of the container transfer station.
Figure 10:
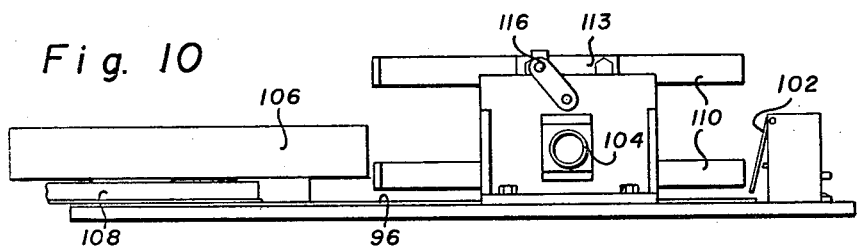
FIGURE 10 is a view in elevation along the line 10—10 of FIGURE 9.
Figure 11:
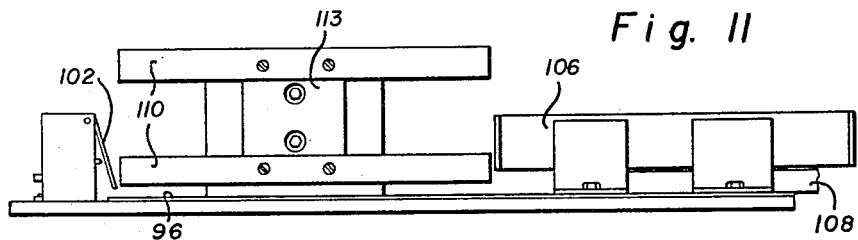
FIGURE 11 is a like view along the line 11—11 of FIGURE 9.

The carton conveyer 22 (FIGURES 1 to 4) functions to feed the individual cartons to the machine to initiate the filling operation. As best illustrated in FIGURES 3 and 4, the carton conveyer 22 is positioned above the case conveyer and is laterally offset from the longidudinal line of the case conveyer. This arrangement facilitates the operations of the transfer station 24 (FIGURES 9 to 17). Any suitable means of support can be provided for the conveyer 22, for example the post supports 92 shown in FIGURE 1.

The carton conveyer functions to deliver cartons one at a time onto a dead plate 96 at the transfer station 24. As illustrated by the sequence positions of the lead carton 100 (FIGURES 13 and 14) the cartons are advanced on the dead plate in single file until the lead carton engages an actuating plate 102 at the end of the dead plate. This causes the transfer cylinder 104 at the transfer station to shove a predetermined number of cartons sideways, as indicated in FIGURE 15. This operation is repeated until ultimately the pattern table at the assembly station 26 is completely covered with a desired pattern of cartons (FIGURES 16 to 19).

Figures 30, 35:
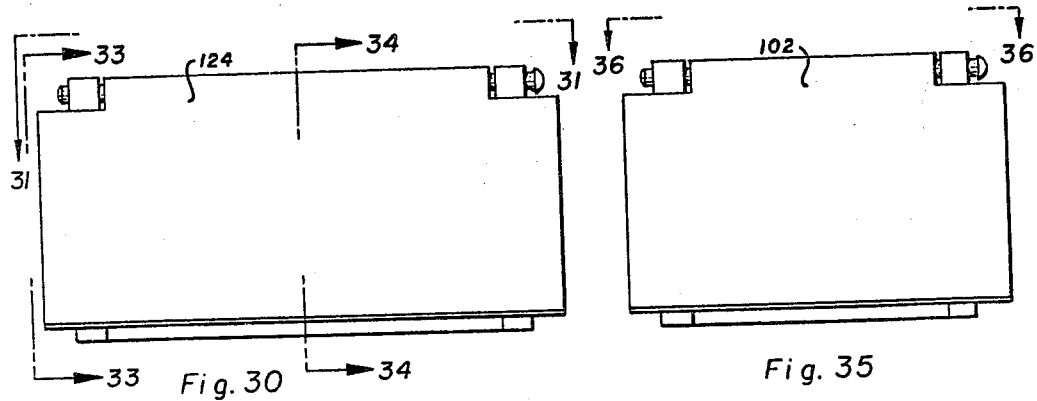
FIGURES 30 to 34 are views of a switch actuating means useful in the machine of the invention.
FIGURES 35 to 37 are like views of another switch actuating mechanism.
Figures 31, 36:
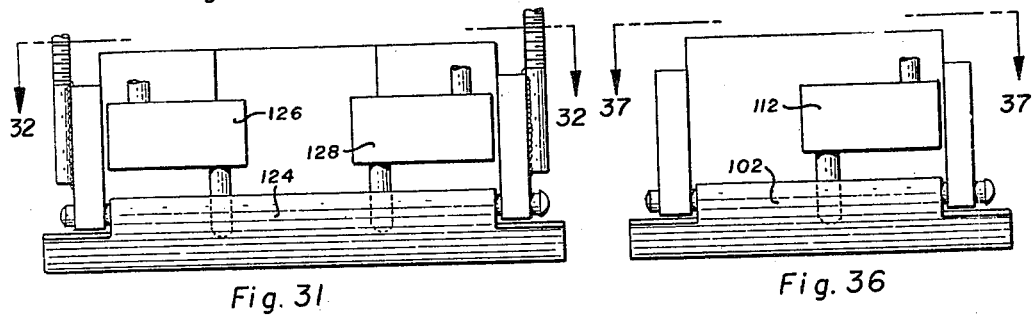
Figures 32, 37:
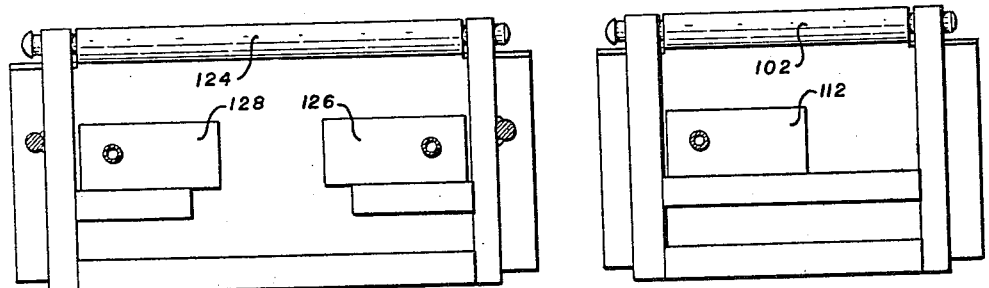
Figures 33, 34:
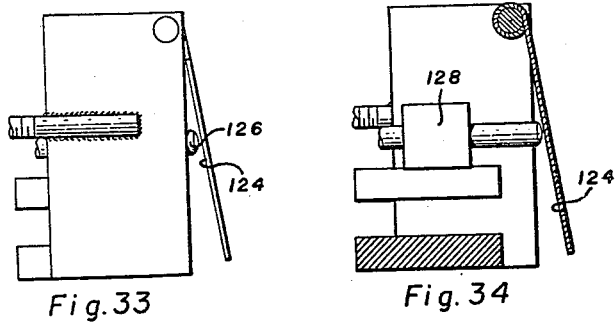
Figure 38:
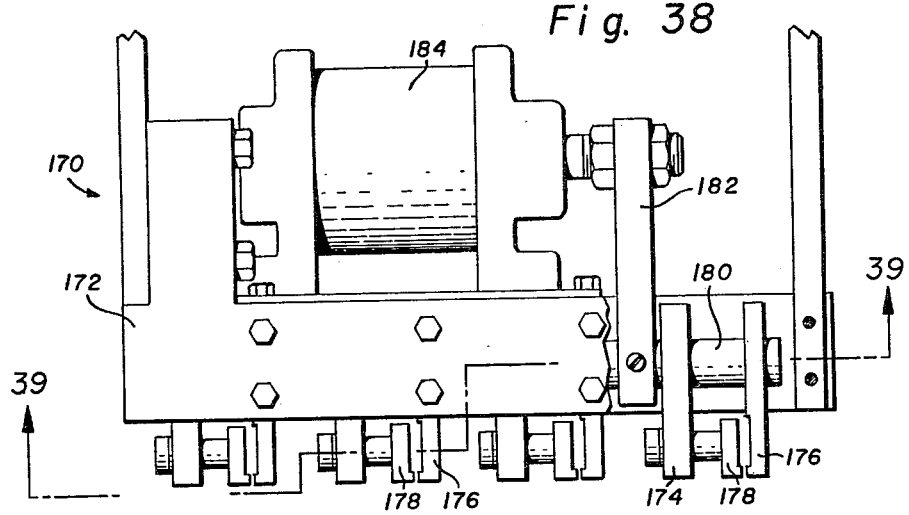
FIGURE 38 is a view in front elevation of a gripper mechanism useful at the loading station of the machine.
Figure 39:
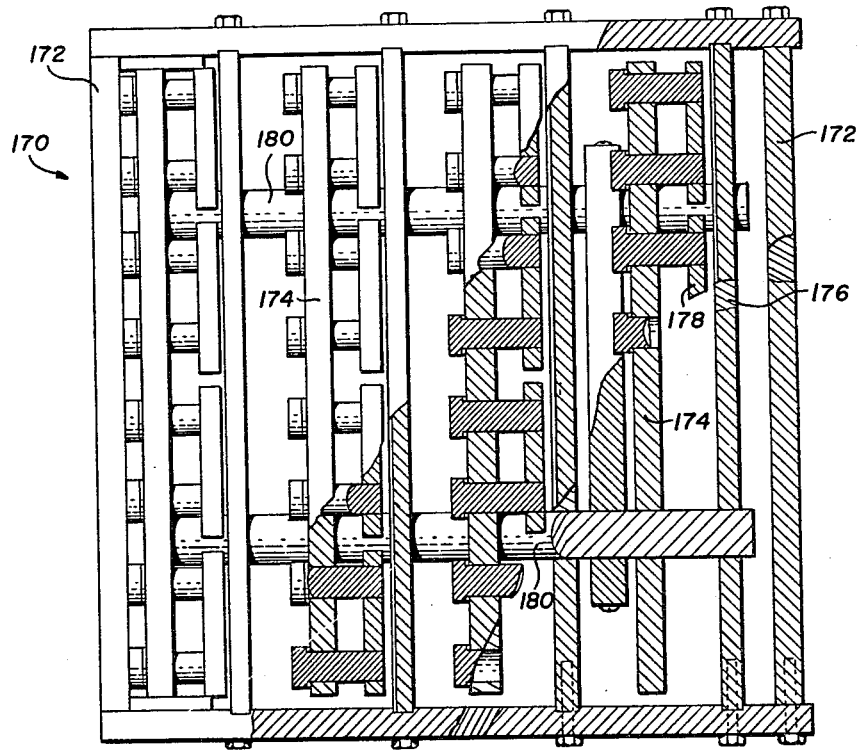
FIGURE 39 is a view in section along the line 39—39 of FIGURE 38.
Figure 40:
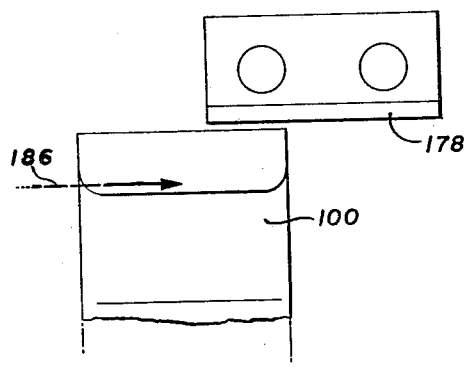
FIGURES 40 to 42 are schematic views in side elevation illustrating the movement of a carton into a supported position within the gripper mechanism.
Figure 43:
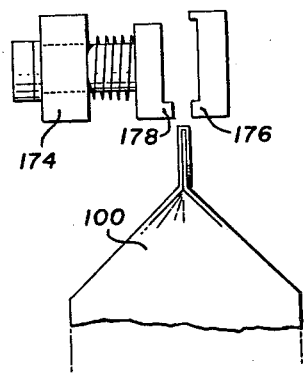
FIGURES 43 to 45 are views in front elevation, corresponding to FIGURES 40 to 42.
Figure 41:
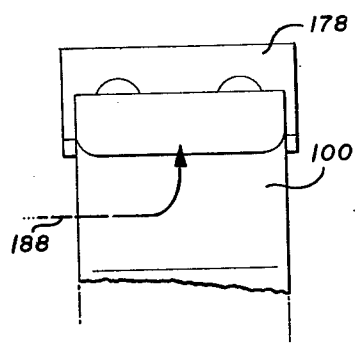
Figure 44:
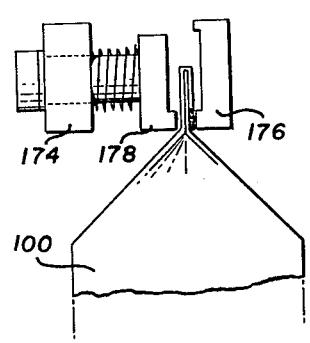
Figure 42:
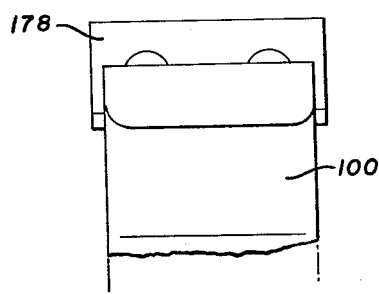

Referring to FIGURES 4 and 9 to 12, the transfer station 24 includes inlet guide plates 106, 108 adapted to cooperate with the pusher bars 110 of the transfer cylinder to provide a uniform row of cartons on the dead plate. The actuating plate 102 (FIGURES 35 to 37) is pivotally suspended in front of a poppet or switch 112 so that this switch is actuated upon movement of the lead carton across the dead plate. As presented in FIGURE 53, the switch 112 shifts the selector valve 114 for the transfer cylinder to advance a single row of cartons onto the pattern table. During this operation, a rearward extension 111 of the pusher bar 110 prevents movement of any additional cartons onto the dead plate (FIGURE 15).

Figure 12:
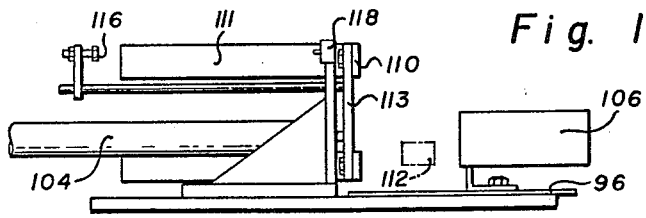
FIGURE 12 is a like view along the line 12—12 of FIGURE 9.

As best illustrated in FIGURE 12, the support plate 113 for the pusher bar mounts an actuator 116 which functions to engage a switch 118 as the transfer cylinder completes its stroke. Switch 118 functions to return the transfer cylinder to permit advance of a new row of cartons onto the dead plate 96. The operation at the station 24 thus repeats itself until the pattern table at the assembly station 26 receives a full pattern of cartons.

*Assembly Station*

The assembly station 26 (FIGURES 2, 4, and 18 to 26) includes a pattern table 120 adapted to receive a full pattern of cartons from the transfer station 24, and a shift or a transfer mechanism including air cylinder 122 to advance the pattern into position beneath the gripper mechanism at the loading station 28.

Figure 18:
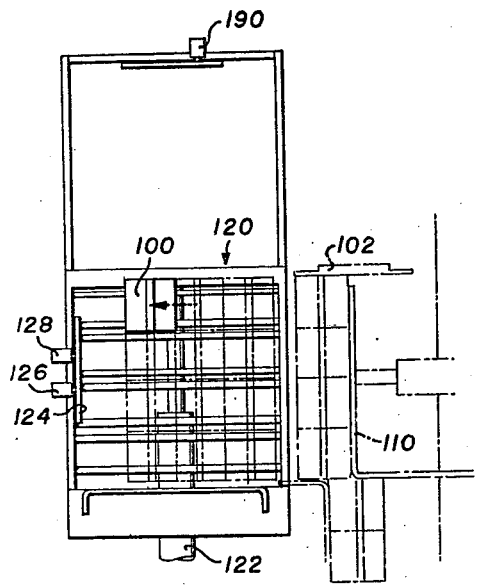
FIGURES 18 to 21 are like views illustrating the operation of the container assembly station.
Figure 19:
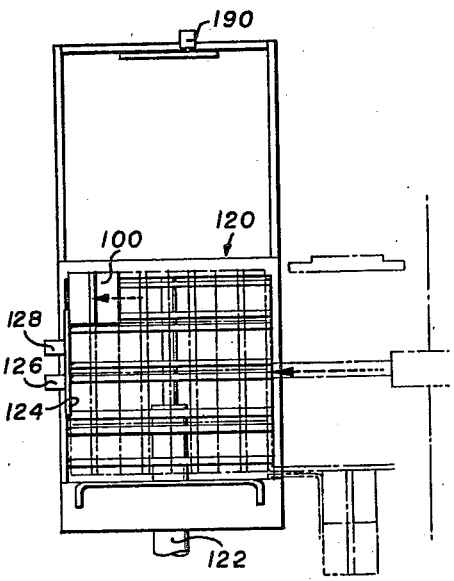

Referring particularly to FIGURES 18 and 19, the formation of a full pattern of cartons on the transfer table 120 causes the first row represented by the carton 100 to engage the actuator 124. The actuator 124 (FIGURES 30 to 34) is similar to the actuator 102, but is of sufficient width to actuate two switches 126 and 128. Switch 126 functions to open the return line to the selector valve 114 so that the switch 118 fails to return the transfer cylinder 104. The switch 128 acts to shift the selector valve 130 for the transfer cylinder 122, causing the latter to advance the pattern table to the loading station. However, as indicated in FIGURE 53, the switch 128 will advance the pattern table only if the loading elevator is in contrast with the switch 132 (raised position), and the gripper mechanism 170 at station 28 is in contact with the switch 134 (open position). In other words, the assembly station 26 will not advance the pattern table unless the grippers at the loading station are open to receive the pattern and the transfer station is controlled to prevent further feeding of rows of cartons onto the pattern stable. It will be noted that the latter function is accomplished by the rearward extension 111 of the pusher bar 110 in the extended position of the transfer cylinder 104 (note FIGURES 17 to 20).

In accordance with the invention, the pattern table 120 is mounted at the assembly station so that it is raised or elevated slightly at the end of its advance into the loading station. As will be explained, this slight elevation of the pattern table facilitates operation of the gripping mechanism at the loading station.

In the apparatus illustrated in FIGURES 22 to 26, the pattern table is constructed in two parts, a lower slide frame 140 and an upper table portion 142 supported for pivotal parallel movements relative to the slide frame by the links 144. The table portion 142 mounts a pair of laterally extending rollers 146 adapted to be engaged by stops 148 mounted on the main frame. As the cylinder 122 nears the end of its stroke, the rollers 146 engage the stops 148 causing the table portion 142 to elevate above the slide portion 140, as illustrated in FIGURES 23 and 24. This produces an upward movement of the carton within the gripper mechanism, as illustrated in FIGURES 40 to 45.

Figure 27:
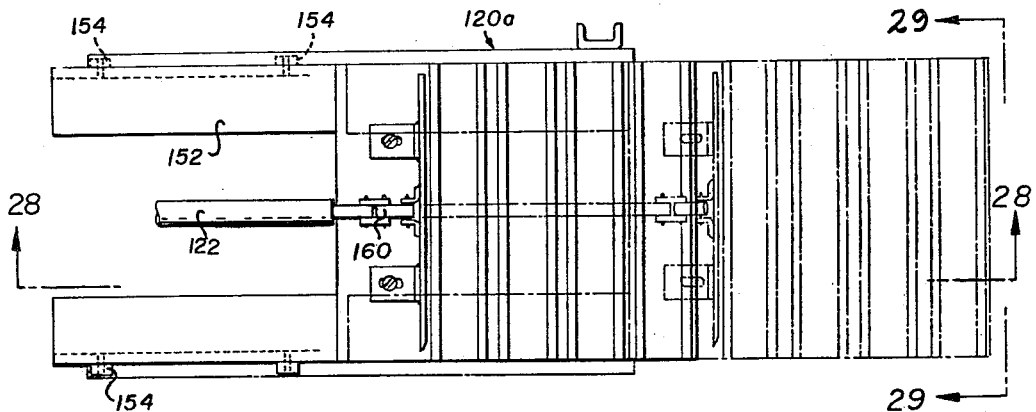
FIGURE 27 is a view like FIGURE 22 of another embodiment of the pattern table.
Figure 28:
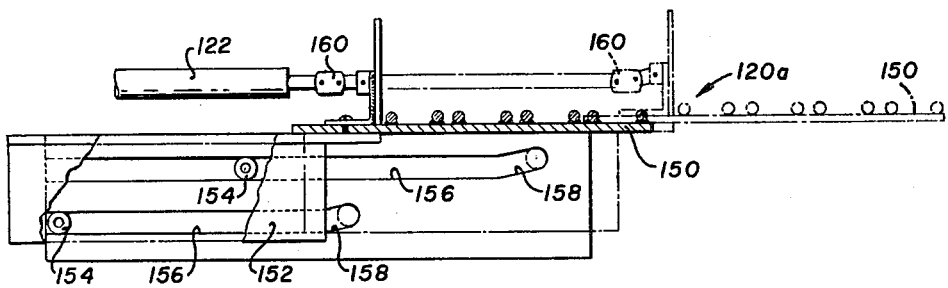
FIGURE 28 is a view in section and side elevation thereof.
Figure 29:
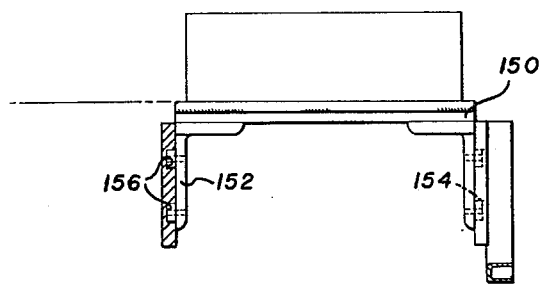
FIGURE 29 is a view in section and end elevation thereof.

FIGURES 27 to 29 illustrate a modified construction of the pattern table to achieve the above described elevating function. In this construction, the table portion 150 is mounted as a forward extension of a slide mount 152. The slide mount is supported by rollers 154 adapted to be received in cammed grooves 156 provided in the main frame. As the cylinder 122 nears the end of its stroke, the rollers 154 are elevated in the terminal portions 158 of the grooves, causing the table to be elevated as indicated in the dotted position of FIGURE 28. A suitable linkage 160 can be provided between the slide mount and the air cylinder to accommodate the lost motion.

*The Loading Station*

The loading station 28 (FIGURES 1 to 4 and 38 to 49) includes a gripper mechanism 170 adapted to operate in conjunction with the loading elevator 30. Essentially the gripper mechanism functions to remove a pattern of cartons from the pattern table 120, and to support the same during subsequent case filling operations involving the loading elevator and the case holding station 20.

The gripper mechanism 170 (FIGURES 38 and 39) includes a head or frame 172 suspended within the loading station above a position of advance of the pattern table. This frame is provided with a series of cross supports 174 mounting a plurality of fixed gripper elements 176. The frame also supports a plurality of movable gripper elements 178 mounted on slide rods 180. The slide rods 180 are mounted for reciprocal movement in the cross supports 174 by means of a rigid connection 182 with the air cylinder 184. For convenience this air cylinder can be mounted directly on on the gripper head.

Figure 45:
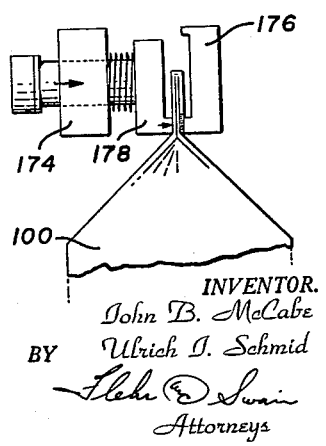
Figure 46:
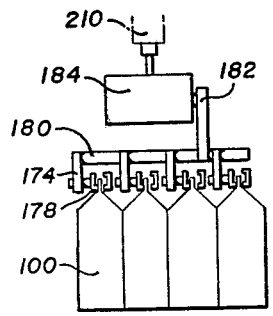
FIGURES 46 to 49 are schematic views in front elevation illustrating the operations at the case filling or loading station.
Figure 47:
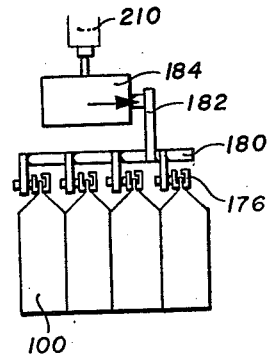

As best seen in FIGURES 40 to 45, the gripper mechanism 170 is synchronized in its operation with respect to advance of the pattern table so that the individual cartons are elevated between the jaws of the gripper head just prior to their being closed. More specifically, the slight elevation of the pattern table at the end of its advance (FIGURE 24 or 28) causes each of the cartons in the pattern to be elevated between a pair of gripper elements 176 and 178. This elevation of the cartons is represented by the arrows 186 and 188 in FIGURES 40 and 41. At the end of its stroke, the pattern table engages the switch 190 (FIGURE 53) causing the selector valve 192 to shift to close the gripper elements on the top flaps of the cartons. This latter operation is represented in FIGURE 45. In this fashion, each of the cartons becomes suspended from above, permitting the pattern table to be retracted.

Referring to FIGURE 53, the closing of the gripper jaws by the cylinder 184 serves to open a bleeder poppet or switch 134 in the return line for the pattern table cylinder 122, causing the pattern table to return to its initial or loading position. During this return movement the pattern table drops slightly due to the camming arrangement so that frictional contact tending to pull the cartons out of the jaws during the return movement is avoided.

The return of the pattern table actuates the switch or poppet 198 to shift the selector valve 114 for the transfer cylinder 104. This causes the transfer cylinder to retract the pusher bar 110 to again initiate operation of the transfer cylinder in forming a new pattern of cartons at the assembly station 26.

As will be explained, return of the pattern table also serves to open an interlock 200 to shift the valve 202 controlling the operations of the loading elevator 30. The closing of the gripper mechanism 170 thus initiates the case filling operation at the loading station through the sequence opening of the interlock 200.

The Loading Elevator

The loading elevator 30 (FIGURES 1 to 4 and 46 and 49) generally functions to produce relative movement between the gripper mechanism 170 and a case at the holding station 20, so that the pattern of cartons supported by the gripper mechanism is deposited within the case. In the embodiment of FIGURE 1, the loading elevator operates to lower the gripper mechanism to a position immediately above the case in the holding station, at which point the gripper mechanism releases the cartons for support within the case.

Figure 48:
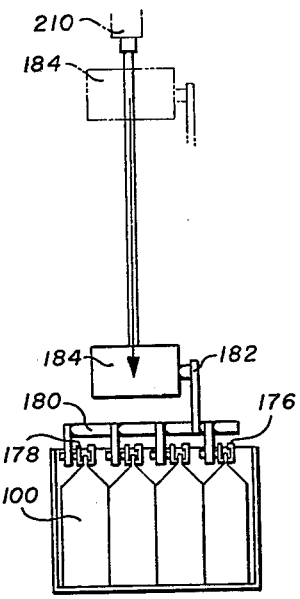
Figure 49:
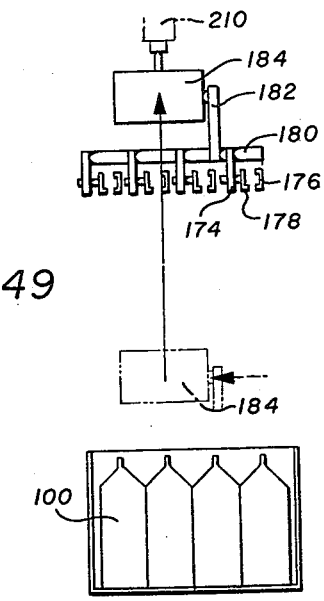

As best seen in FIGURE 4, the air cylinders 210 for the loading elevator are mounted on a cross support 212 of the main frame. The gripper mechanism 170 is supported for vertical movements below the cross support by the rods 214 of the air cylinders. The gripper mechanism is thus supported for free vertical movements relative to the case holding station 20, as generally indicated in FIGURES 46 to 49. However, this lowering movement of the loading elevator can only be accomplished if the gripper mechanism is closed to bleed the poppet 194, the pattern table 120 retracted to bleed the interlock or poppet 200 in the same line, and the switch 76 actuated by an empty case in position at the holding station 20. In the operating cycle, the poppet 200 is actuated by return of the pattern table, causing the selector valve 202 to shift to admit low pressure air from line 48 to the top of the elevator cylinders 210. These cylinders lower the cartons gently into the case at the holding station 20 (FIGURE 48).

Figure 50:
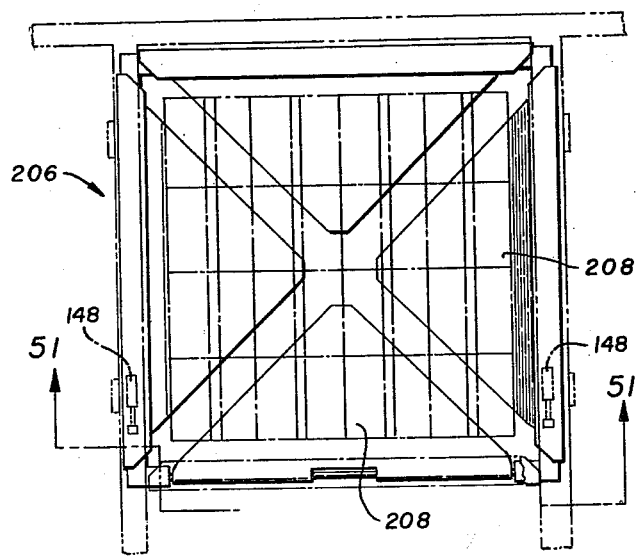
FIGURE 50 is a view in top plan of a guide assembly useful at the loading station.
Figure 51:
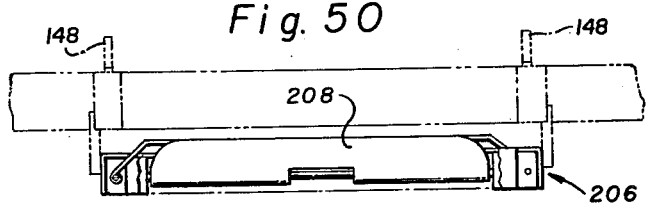
FIGURE 51 is a view in side elevation thereof along the line 51—51 of FIGURE 50.
Figure 52:
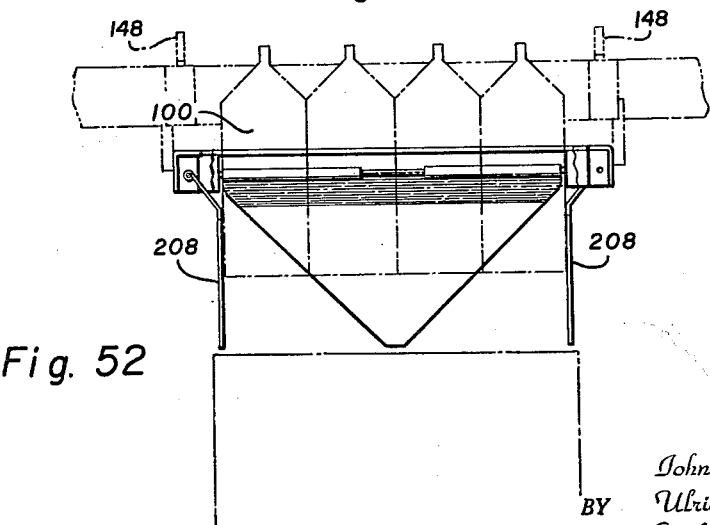
FIGURE 52 is a view in section and elevation, illustrating the operation of the guide assembly.

Referring to FIGURES 1 and 3, a guide mechanism 206 is supported by the main frame in the path of descent of the loading elevator 30. As shown in FIGURES 50 to 52, the guide mechanism is composed of a quadrant of generally triangular plates 208 which are normally spring biased to a substantially horizontal position (FIGURE 51). The plates are spaced from one another so as to permit downward pivotal movement upon engagement with a pattern of cartons descending with the loading elevator, although offering resistance to passage of the cartons due to the spring pressure. The guide mechanism 206 is vertically aligned with the holding station and spaced with respect to a case in the holding station so that the plates 208 positively guide the pattern of cartons into the case, as represented in FIGURE 52, without preventing subsequent return of the plates to the normal horizontal position.

As best illustrated in FIGURE 53, the down stroke of the loading elevator causes actuating devices carried by the gripper mechanism (e.g. 214 in FIGURES 1, 2) to engage the poppets and switches 80, 216 and 218. The switch 216 causes the selector valve 202 to admit low pressure air from the line 48 to the bottoms of the air cylinders 210 to stop the descent of the loading elevator. Simultaneously the switch 218 bleeds the line to the valve 192 to retract or open the gripper mechanism 170, thereby releasing the cartons. Opening of the grippers in turn causes the switch 228 to shift the selector valve 202 to admit high pressure air from line 44 to the bottoms of the cylinders 210, to return the elevator 30 to the up position. At the same time the switch 80 functions to shift the valve 70 to retract the case stop 56 to permit discharge of the filled case, and to retract the case stop 54 to permit entry of the next empty case, completing the cycle of the machine.

The Indexing Mechanism

So far the operation of the machine has been described in connection with the filling of cases with a single layer of cartons, for example, quart, half-gallon or other relatively large containers. However, as represented in FIGURES 54 to 57, it is frequently desirable to deposit two or more layers of containers in a single case (e.g. individual containers in the half-pint size). This can be accomplished in the machine of the invention through use of a simple indexing mechanism 229 of the type illustrated schematically in FIGURE 53A.

Essentially the indexing mechanism consists of a rotary disc 230 fitted with upwardly extending pins 232, of varying lengths, and downwardly directed actuators 234. The disc 230 is provided with an escapement (not shown) which is responsive to each advance of the pattern table 120 to rotate the disc a predetermined amount on its axis. This causes a new one of the pins 232 to be rotated into position beneath the loading elevator 30. As is apparent from FIGURE 53A, the disc 230 is vertically movable against the pressure of spring 236 to permit movement of the actuators 234 in response to the down-stroke of the loading elevator. The actuators 234 are spaced about the periphery of the disc so that the switches 216 and 218 are engaged at each position of rotation of the disc, whereas the switch 80 is engaged only when the longest pin 232 is in position beneath the elevator. This construction insures cooperation of the switches 216, 218 to release the cartons at each descent of the loading elevator, and to return the elevator to the up position. It also permits the filled case to be released from the holding station 20 (by the switch 80) when the last layer has been deposited in the case.

Figure 55:
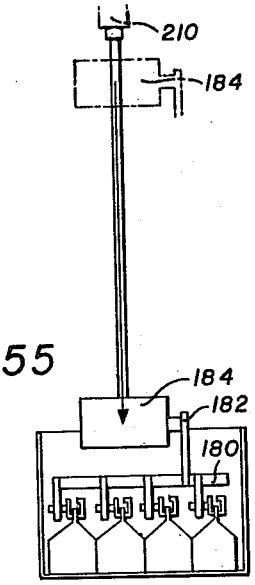
Figure 56:
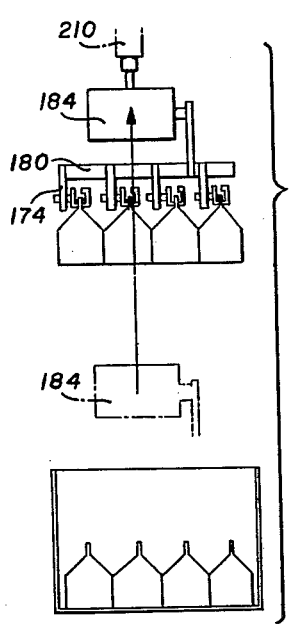
Figure 57:
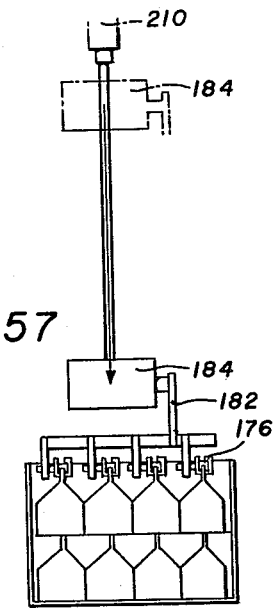

To illustrate, it is assumed that the shortest of the pins 232 is in position to intercept the first descent of the loading elevator. This pin is of a dimension that the switch 218 releases the first layer of cartons when they are immediately above the bottom of the case at the station 20 (FIGURE 55). The switch 216 simultaneously acts to send the elevator up to receive the next layer. When a new pattern of cartons has been formed, the advance of the pattern table with this layer causes the escapement to turn the disc 230 to position the next longest of the pins 232 beneath the elevator 30. This pin is of a length to permit the second layer to be deposited above the first layer in the case (FIGURE 57). This operation is repeated for all but the last or top layer. When the top layer of cartons descends, the indexing of the disc is such that the longest pin 232 is in position and also the actuator for the switch 80. The latter serves to retract the cylinders 72, 74 for the case stops, permitting discharge of the filled case and entry of a new empty case into the holding station.

Operation

Reviewing briefly the operation of the machine, empty cases are fed to the machine at a convenient working level by the case conveyer 32. Merchandise to be loaded into the cases, such as bottled goods, cartons of milk, etc., is simultaneously fed to the machine by the conveyer 22 at an elevation above the case conveyer. A cycle of operations is initiated by movement of an empty case into the holding station 20 where it contacts the mechanism 52. This actuates the valve 70 to lower the stop 54 to retain the second case in line and to raise the stop 56 in position before the lead or entering case. Movement of the lead case into a loading position within the holding station simultaneously opens an interlock 76 in the pattern table and loading elevator circuits.

Figure 20:
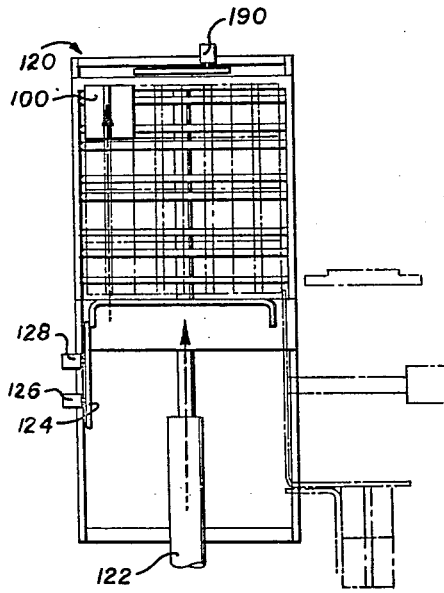
Figure 21:
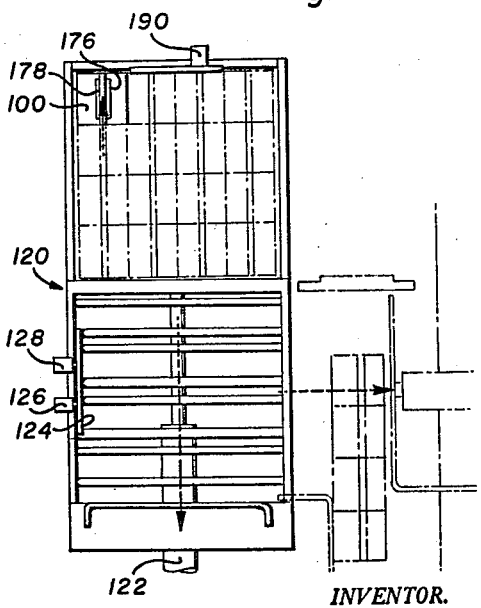

The cartons fed by the conveyer 22 move onto the dead plate 96 where they are advanced in single file until the lead carton 100 engages the plate 102 to actuate the switch 112. This shifts the valve 114 to advance the transfer cylinder 104, causing a row of four cartons to be shoved laterally onto the pattern table 120 (FIGURES 14 and 15). This operation is repeated until the fourth or last row of the cartons is shoved onto the pattern table, at which time the first row of cartons engages the plate 124 to actuate the switches 126 and 128. The switch 126 opens the return line to valve 114 so that the transfer cylinder 104 remains in extended position. The switch 128 shifts the valve 130 for the cylinder 122 causing the pattern table to advance the newly formed pattern of cartons into the loading station 28 (FIGURES 19 to 21).

Within the loading station, the pattern of cartons is raised by the camming mechanism of the pattern table (FIGURES 24, 28), causing the upper flaps of the cartons to be elevated within the jaws 176, 178 of the gripper mechanism 170 (FIGURES 40 to 44). Simultaneously the pattern table engages the switch 190 causing the valve 192 to advance the air cylinder 184, thereby closing the gripper elements to supportingly grasp each of the cartons (FIGURE 45). The closing of the gripper jaws bleeds the poppet 134 to shift valve 130 and immediately return the pattern table, and simultaneously opens the interlock 194 in the elevator circuit. At this stage in the operations, the pattern of cartons hangs suspended beneath the loading elevator 30, immediately above the empty case at the holding station 20.

On its return, the pattern table actuates the switch 198 to shift valve 114 to retract the transfer cylinder, thereby initiating the formation of a new pattern of cartons at the assembly station. It also bleeds the interlock 200 to shift the valve 202. Low pressure air from the line 48 now enters the top of the cylinders 210 in the loading elevator circuit, causing the loading elevator to gently lower the pattern of cartons into the case at the holding station. During this lowering movement, the cartons pass through the spring plates 208 of the guide mechanism 206, insuring a proper alignment of the pattern as it passes into the case. At the end of its downstroke, the loading elevator actuates the switches 80, 216, 218. The switch 216 admits low pressure air to the bottoms of the cylinders 210, stopping the descent of the loading elevator. The switch 218 causes the valve 192 to open the gripper mechanism 170, releasing the cartons within the case. The opening of the grippers causes the switch 228 to shift the valve 202 to admit high pressure air to the lower portions of the cylinders 210, returning the loading elevator to the up position. Simultaneously the switch 80 shifts the valve 70 to retract the case stops 54, 56 to admit entry of the next empty case and discharge of the filled case to further processing. This completes the cycle of the machine.

*Step-Up Loading Station*

FIGURES 1 to 57 illustrate a machine in which the cartons are formed into patterns, or layers, for lowering by the loading elevator into cases at the holding station. However, in many plant operations, it may be desirable to elevate the cases to receive the patterns of cartons, and then to discharge the filled cases at the raised level or at the original level. A machine of this type can be substantially identical to the machine which has been so far described, with the exception that the loading elevator functions to elevate the cases rather than to lower the cartons.

Figure 59:
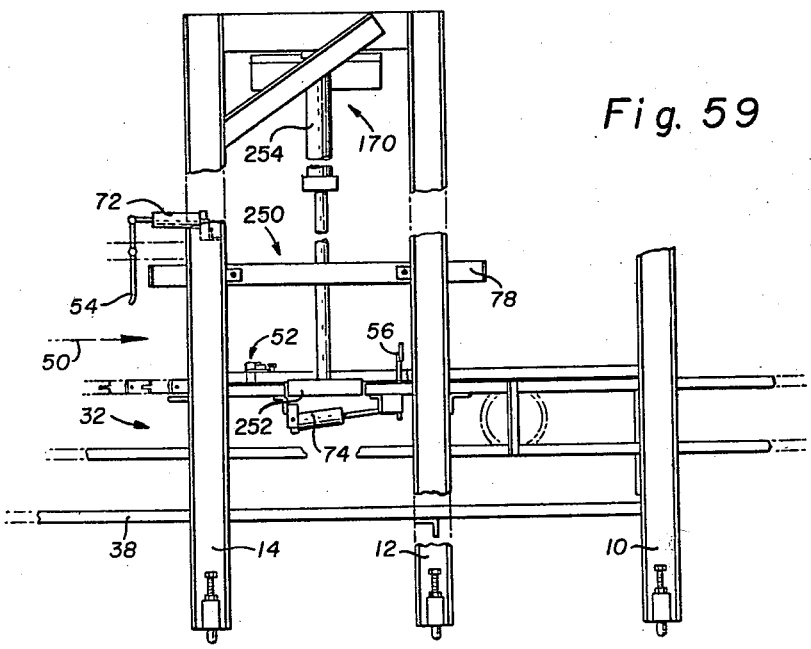
FIGURES 59 and 60 are views in front and side elevation, respectively, of elevator mechanism employed with the machine of FIGURE 58.
Figure 60:
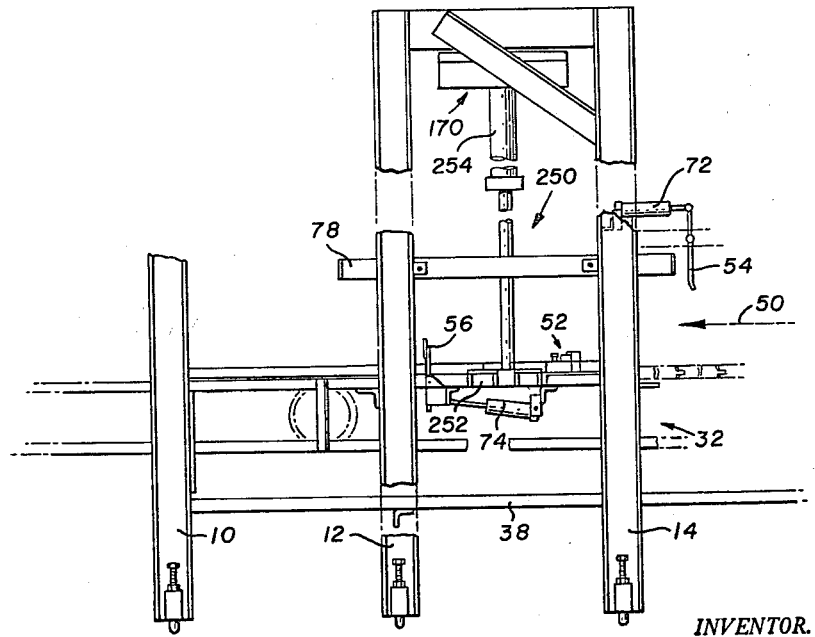
Figure 61:
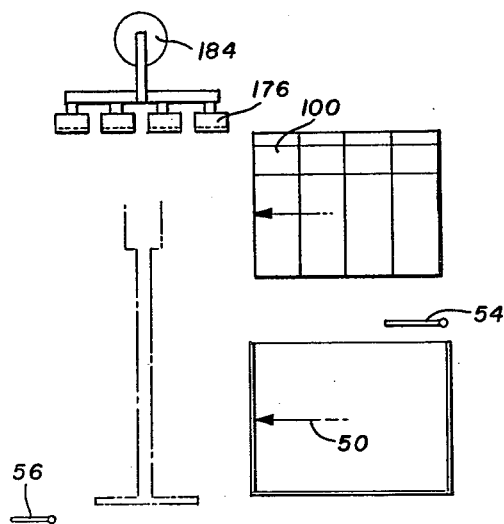
FIGURES 61 to 64 are schematic views showing the operations at the case filling or loading station of the machine of FIGURE 59.
Figure 62:
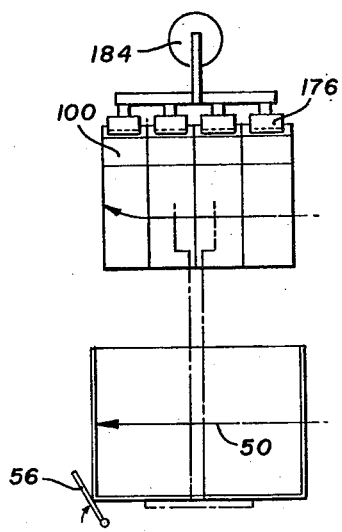

FIGURES 58 to 65 illustrate an embodiment of the machine in which a case elevator 250 is substituted for the carton elevator 30 previously employed. Referring to FIGURES 59 and 60, the case elevator comprises a pair of edge supports 252 positioned on either side and in alignment with the case conveyer 32. The supports 252 are mounted for vertical movements by an air cylinder 254, and are spaced relative to the case conveyer so as to permit an empty case to be engaged and elevated within the loading or case filling station 28. The stroke of the cylinder 254 is sufficient to raise a case from the holding station 20 to a position where the bottom of the case is just below a pattern of cartons held in the gripper mechanism 170. In this case, however, the gripper mechanism is supported in fixed position above the case elevator by the side frames 12 and 14.

In other respects, the machine of FIGURES 58 to 65 is essentially the same as the machine of FIGURE 1. The individual cartons enter on the conveyer 22, are transferred at the station 24 to form a pattern at the assembly station 26, and are charged by the pattern table at the assembly station to the gripper mechanism 170, in the manner as previously described. The case elevator 250 then functions to lift the empty case to receive the pattern of cartons, which is released by the gripping mechanism, and the filled case is lowered by the elevator 250 for discharge on the conveyer 32.

Figure 63:
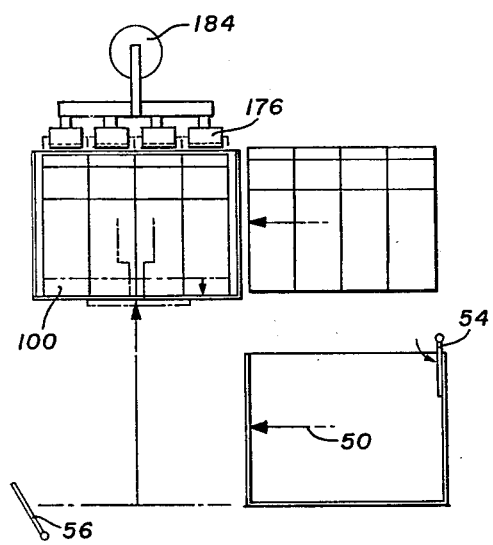
Figure 64:
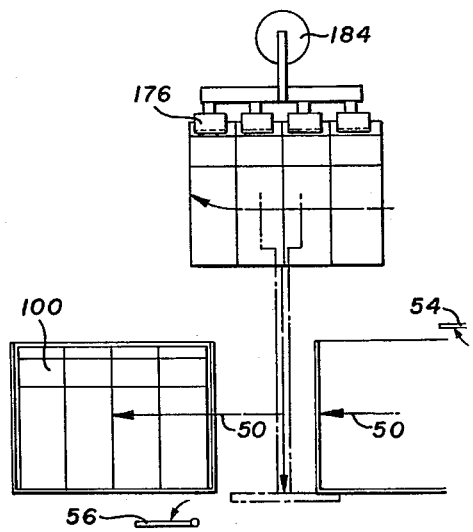
Figure 65:
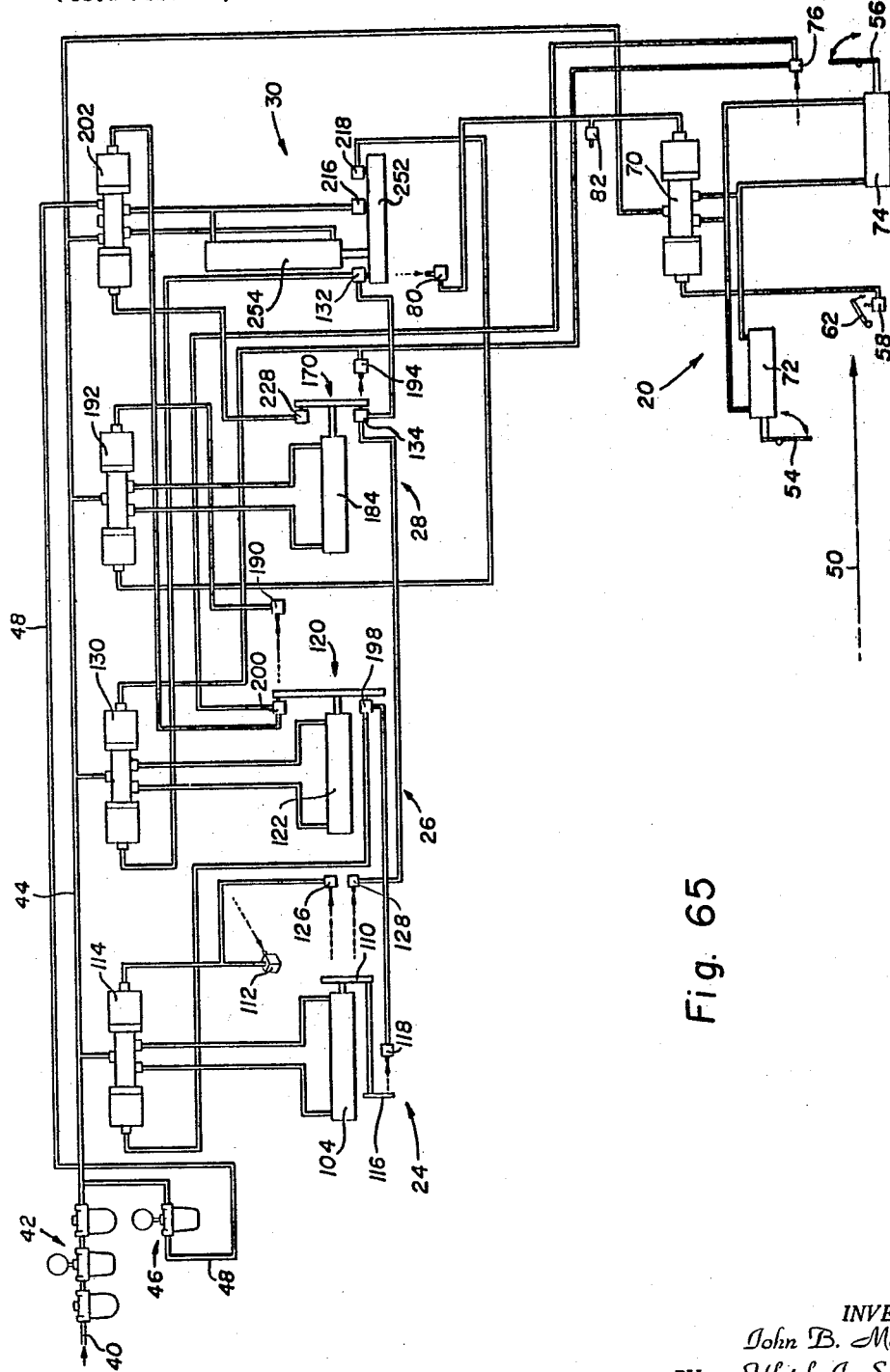
FIGURE 65 is a schematic view illustrating the system of control for the machine of FIGURE 58.

The overall operation of the machine can best be understood by reference to FIGURES 61 to 64. The empty case enters and is held at the station 20 by the case stop 56, as before. Thereafter the pattern table 120 charges a pattern of cases into the gripper mechanism 170. As shown in FIGURE 63, the case elevator now functions to raise the edge supports 252 to position the case about the pattern of cartons suspended by the gripper mechanism. However, as represented in FIGURE 65, the elevator switch 216 and the pattern release switch 218 are re-positioned for operation on the up stroke of the case elevator. Specifically, switch 216 shifts the valve 202 to admit air to the upper end of the air cylinder 254 to stop the upward movement of the case elevator. The switch 218 causes the valve 192 to open the gripper jaws to release the pattern of cartons within the case. As illustrated in FIGURES 64 and 65, the opening of the gripper jaws causes the switch 228 to send the case elevator 250 back down to the level of the case conveyer. At the end of its down stroke, the case elevator actuates the switch 80, shifting the valve 70 to retract the case stops 54, 56, thereby permitting entry of a new case and discharge of the filled case on the conveyer 32. The entering case actuates the switching mechanism 52 to again initiate the cycle of operations.

Figure 66:
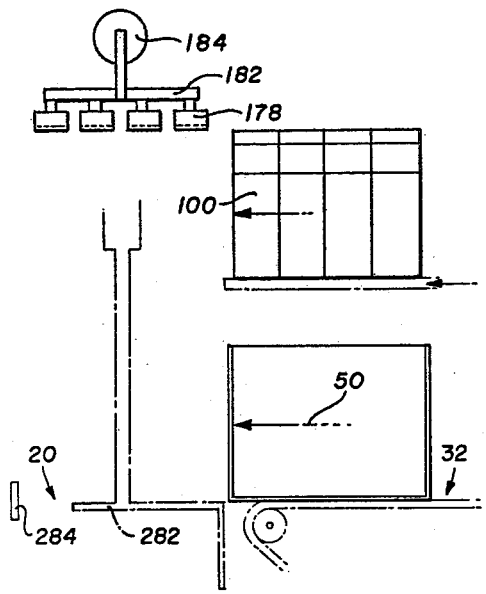
FIGURES 66 to 69 are schematic views, illustrating the case filling operations in accordance with a further embodiment of the invention.
Figure 67:
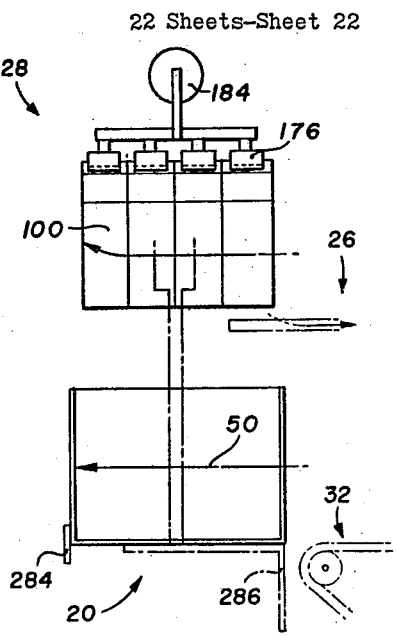
Figure 68:
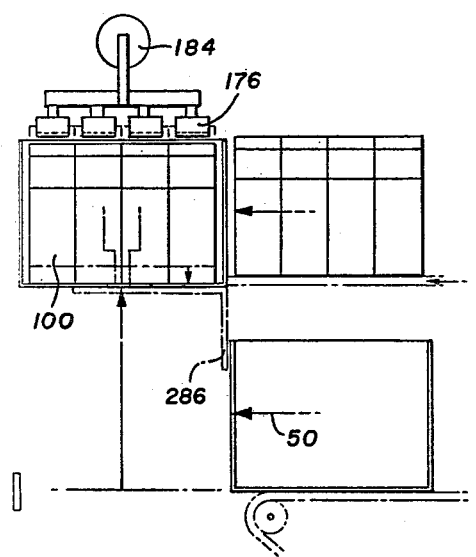
Figure 69:
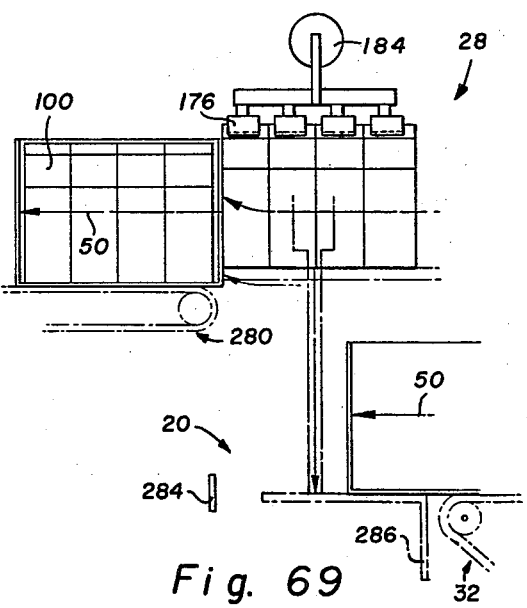

As represented in FIGURES 56 to 69, it is also contemplated that the case elevator 250 can be employed to step-up the entering cases for discharge at a higher level. Such an operation can be simplified through use of the cylinder 122 at the assembly station 26 to discharge the filled cases directly onto a discharge conveyer 280 at the same level as the pattern table 120 (FIGURE 69). Referring to FIGURES 66 and 67, a pattern of cartons is fed to the gripper mechanism 170 at the station 28, and an empty case is charged to the elevator platform 282, which cooperates with a fixed stop 284 to form the holding station 20. The case elevator is now raised to position the case about the pattern of cartons, and the gripper jaws opened to release the pattern within the case. In this embodiment of the machine, the switch 132 is actuated by the case elevator in raised position, to permit advance of the pattern table when a new pattern has been formed. This operation, represented in FIGURE 69, causes the case on the loading elevator to be transferred onto the discharge conveyer 280. The forward stroke of the pattern table also causes the gripper elements to close on the new pattern, as before, and the pattern table to be immediately withdrawn. Therefore, the opening of the gripper jaws and the return of the pattern table causes the switches 200 and 228 to send the case elevator down to receive the next case from the case conveyer 32. It will be noted that the latter case is prevented from moving into the holding station 20, during the discharge operations at the step-up level, by stop means 286 secured to the undersides of the edge supports 252 of the case elevator. The cycle of the modified machine is thus completed.

We claim:

1. In a case filling machine, a case holding station, means transferring an empty case to said case holding station, a carton assembly station, means forming a layer of cartons at said assembly station, a loading station including a loading elevator and means to remove a layer of cartons from said assembly station, means controlling the operation of said stations whereby the loading elevator deposits said layer of cartons within a case at the holding station, and an indexing mechanism adapted to repeat the operation of said controlling means whereby additional layers of cartons are deposited within said case, said indexing means comprising projecting members of varying length and selectively operable means adapted to bring one of said projecting members at a time into engagement with said loading elevator, the length of said projecting members varying in accordance with the layer depth of cartons to be deposited within the case.

2. A case filling machine as in claim 1 wherein said selectively operable means is a rotary disc mounting said projecting members on its periphery.

3. A case filling machine as in claim 2 wherein said rotary means includes switch actuators on a side opposite said projecting members adapted to selectively operate switching means forming a part of said controlling means.

4. In a case filling machine wherein a loading elevator sequentially lowers and deposits a layer of cartons in a case therebelow, the improvement comprising; a rotary indexing member having a plurality of projecting elements of different lengths thereon; means for periodically rotating said member to sequentially position said elements in the path of descent of said elevator to be engaged thereby at respectively different levels; and control means responsive to engagement of said elements by the descending elevator for stopping the descent thereof, the difference in length between successive elements corresponding to the height of the layer of cartons being deposited in said case.

5. A machine as defined in claim 4 wherein said rotary indexing member is mounted for translational movement by engagement of said elevator with an element, said control means comprising a switch actuable by said translational movement.

References Cited in the file of this patent

UNITED STATES PATENTS 2,608,038    Knowlton -------------- Aug. 26, 1952